J. S. LOCKERBY.
VEGETABLE OR FRUIT CUTTER.
APPLICATION FILED JULY 8, 1916.
1,231,395.
Patented June 26, 1917.
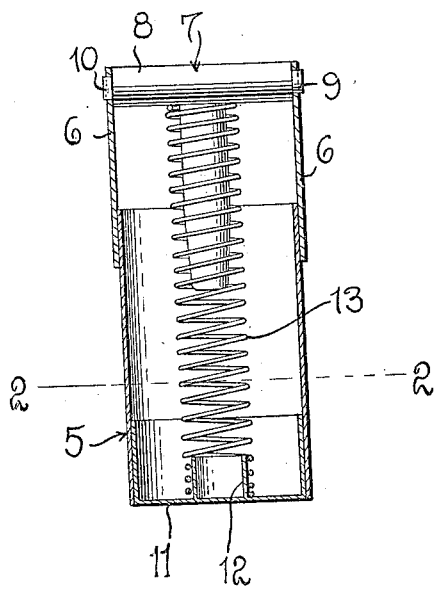
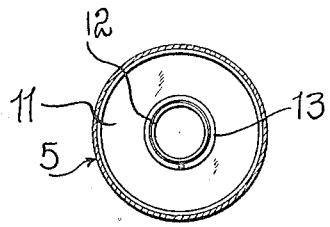
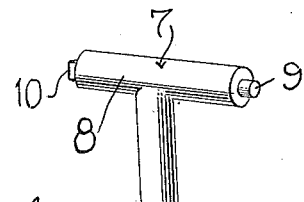
Inventor
J. S. LOCKERBY
By Watson E. Coleman
Attorney

UNITED STATES PATENT OFFICE.

JACOB S. LOCKERBY, OF HOQUIAM, WASHINGTON.

VEGETABLE OR FRUIT CUTTER.

1,231,395.

Specification of Letters Patent. Patented June 26, 1917.

Application filed July 8, 1916. Serial No. 108,154.

*To all whom it may concern:*

Be it known that I, JACOB S. LOCKERBY, a citizen of the United States, residing at Hoquiam, in the county of Grays Harbor and State of Washington, have invented certain new and useful Improvements in Vegetable or Fruit Cutters, of which the following is a specification, reference being had to the accompanying drawings.

This invention relates to an improved vegetable or fruit cutter and has for its primary object to provide an extremely simple, durable and inexpensive device whereby vegetables or fruits may be thoroughly and quickly cut up into relatively fine particles.

It is another object of the invention to provide a device for the above purpose which may be easily maintained in a thoroughly sanitary condition, the several parts thereof being easily and quickly assembled or disassembled.

It is a further general object of the invention to provide a very serviceable device for the above purpose which may be operated with a minimum of manual labor.

With the above and other objects in view, my invention consists in the novel features of construction, combination and arrangement of parts to be hereinafter more fully described, claimed and illustrated in the accompanying drawing, in which, Figure 1 is a vertical sectional view of a vegetable cutter constructed in accordance with the preferred embodiment of my invention;

Fig. 2 is a horizontal section taken on the line 2—2 of Fig. 1; and

Fig. 3 is a detail perspective view of the handle member.

Referring in detail to the drawing, 5 designates the cylindrical casing which is open at its opposite ends. This casing is preferably formed of sheet steel and the outer surface thereof may be nickel-plated. To one end of this casing, at diametrically opposite points, longitudinally projecting arms 6 are soldered or otherwise fixed at one of their ends. 7 designates the handle member which is of T-shaped form, and upon one end of the cylindrical head 8 thereof a reduced, longitudinally projecting, cylindrical stud 9 is formed. A rectangular stud 10 projects from the other end of said head. In the end of one of the arms 6, a circular opening is formed to receive the stud 9, while the other arm 6 is provided with a rectangular opening to receive the stud 10. The arms 6 are sufficiently resilient to enable the same to be sprung outwardly so that the head of the handle member can be removed from between said arms.

A plunger 11 fits snugly within the casing 5 and has longitudinal sliding movement with respect thereto. This plunger is in the form of a shallow cylinder open upon its upper side, and an axially projecting, tubular stud 12 is suitably fixed to the bottom wall thereof. To said stud, one end of a coil spring 13 is secured. The upper portion of this spring surrounds the longitudinally extending stem 14 of the handle member 7. In the operation of the device, it will be understood that the spring 13 normally acts to project the plunger 11 to a position in one end of the casing or cylinder 5. Thus, when the casing is pressed downwardly upon the fruit or vegetable, it will cut through the same, and the plunger 11 will be forced upwardly into said casing against the action of the spring 13. When the device is lifted, said spring will expand and force the material which has entered the casing 5 outwardly through the lower end thereof. In this manner, it will be seen that the fruit or vegetables may be very easily and quickly cut or divided into relatively fine particles. The device may also be advantageously employed as a dough cutter for cutting biscuits from the body of the dough.

It is apparent, of course, that the device may be constructed in any desired size, and the cylinder or casing 5 can also be made in different forms. The device as a whole is exceedingly simple and durable in its construction and highly convenient for the purpose in view.

While I have shown and described the preferred construction and arrangement of the several parts, it is to be understood that the invention is susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:—

1. A device of the character described including a casing, resilient arms fixed at diametrically opposite points to one end of the casing and projecting longitudinally therefrom, a handle member detachably mounted in said arms and having a stem projecting axially into one end of the casing, a plunger longitudinally movable in said casing, and a spring surrounding said stem and bearing upon the plunger and normally holding the same yieldingly in the opposite end of the casing.

2. The combination with a cylindrical cutting member, and a spring-pressed plunger operating therein, of resilient arms fixed to one end of the cutting member at diametrically opposite points and projecting longitudinally therefrom, and a detachable handle arranged between said arms and having terminal means for co-acting engagement therewith, whereby the handle is held against rotation, said handle constituting a bearing for one end of the plunger spring.

3. The combination with a cylindrical cutting member, and a spring-pressed plunger operating therein, of diametrically opposed resilient arms fixed to one end of the casing and projecting longitudinally therefrom, and each of said arms being provided adjacent its free end with an opening, a hand grip provided with terminal means for engagement in the openings of the respective arms, said hand grip being removably held by the resilient pressure of the opposed arms against the ends thereof, and a stem centrally fixed to the hand grip and projecting into the opposed end of the cutting member to provide a guide for the plunger spring.

In testimony whereof I hereunto affix my signature in the presence of two witnesses.

JACOB S. LOCKERBY.

Witnesses:
  SHERMAN L. CRAWFORD,
  ELMER UPSON.

Copies of this patent may be obtained for five cents each, by addressing the "Commissioner of Patents, Washington, D. C."